(12) United States Patent
Ide

(10) Patent No.: US 7,190,503 B2
(45) Date of Patent: Mar. 13, 2007

(54) ELECTRO-OPTICAL DEVICE, METHOD OF MANUFACTURING THE SAME, AND ELECTRONIC APPARATUS

(75) Inventor: Katsuya Ide, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 10/969,931

(22) Filed: Oct. 22, 2004

(65) Prior Publication Data

US 2005/0117197 A1  Jun. 2, 2005

(30) Foreign Application Priority Data

Oct. 28, 2003 (JP) ............... 2003-367499
Oct. 28, 2003 (JP) ............... 2003-367500

(51) Int. Cl.
*G02F 1/03* (2006.01)
*G02F 1/155* (2006.01)
*G02F 1/295* (2006.01)
*G02F 1/1333* (2006.01)

(52) U.S. Cl. ............ 359/245; 359/252; 359/254; 359/265; 359/266; 385/8; 385/146; 385/901; 349/58; 349/60; 349/62; 349/65; 349/67; 349/69; 349/84

(58) Field of Classification Search ........ 359/245, 359/252–254, 265, 266; 385/8, 146, 901; 349/58, 60, 62, 65, 67, 69, 84

See application file for complete search history.

(56) References Cited

U.S. PATENT DOCUMENTS 6,831,727 B2 * 12/2004 Akiyama et al. ........ 349/158

2002/0003711 A1  1/2002 Hashimoto et al.
2003/0154953 A1  8/2003 Yasui

FOREIGN PATENT DOCUMENTS

| JP | A-62-238526 | 10/1987 |
|---|---|---|
| JP | U-2-1727 | 1/1990 |
| JP | A-2-282225 | 11/1990 |
| JP | A-7-114347 | 5/1995 |
| JP | A-10-260398 | 9/1998 |
| JP | A-11-202330 | 7/1999 |
| JP | A-2001-356342 | 12/2001 |
| JP | A-2003-050392 | 2/2003 |
| JP | A-2003-241803 | 8/2003 |
| JP | A-2004-288570 | 10/2004 |

* cited by examiner

*Primary Examiner*—Evelyn A. Lester
(74) *Attorney, Agent, or Firm*—Oliff & Berridge, PLC

(57) ABSTRACT

A method of manufacturing an electro-optical device having a curved display surface with high reliability is provided. A liquid crystal panel 100 comprising a TFT array substrate 10 and a counter substrate 20, each composed of a glass substrate or a quartz substrate, is thinned down to, for example, a thickness of 25 μm by a polishing process or an etching process. Subsequently, a first polarizing plate 140, first spacers 260, the liquid crystal panel 100, second spacers 270, and a second polarizing plate 150 are superposed on a base 210 having a curved surface 220 in this order, and then the outer circumference of the second polarizing plate 150 is pressed against the base 210 while curving the second polarizing plate 150 along the curved surface 220 of the base 210. Then, in order to maintain such a curved state, the second polarizing plate 150 is fixed to the base 210 by a double-faced tape 280.

19 Claims, 14 Drawing Sheets

ELECTRO-OPTICAL DEVICE, METHOD OF MANUFACTURING THE SAME, AND ELECTRONIC APPARATUS

BACKGROUND OF THE INVENTION

1. Field of Invention

The present invention relates to an electro-optical device in which an electro-optical material is held in a substrate, an electronic apparatus using the same, and a method of manufacturing the electro-optical device.

2. Description of Related Art

In general, in electro-optical devices, such as liquid crystal devices and organic electro-luminescent display device, an electro-optical material is held by an electro-optical device substrate, and various images are displayed on a substantially central region of the substrate, which is an image display region.

In recent years, the development of the new type of display device having an electro-optical device in which its display surface is curved has been required. Complying with such requirements, it has been suggested that a flexible polymer film is used as an electro-optical device substrate such that the electro-optical device substrate can be curved (for example, see Japanese Unexamined Patent Application Publication No. 10-260398). However, when a polymer film is used as an electro-optical device substrate, the reliability of an electro-optical device deteriorates because the polymer film has low weather resistance and heat resistance.

Accordingly, the present invention is designed to solve the above-mentioned problems, and it is an object of the present invention to provide an electro-optical device having a curved display surface with high reliability, an electronic apparatus using the same, and a method of manufacturing the electro-optical device.

SUMMARY OF THE INVENTION

In order to achieve the above-mentioned object, the present invention provides an electro-optical device comprising: a sheet-shaped electro-optical device substrate made of a hard material; an electro-optical material held in the electro-optical device substrate; and a first member having a curved surface, wherein the electro-optical device substrate is fixed to the first member so as to be curved along the curved surface.

In the present invention, from the fact that a sheet-shaped electro-optical device substrate can be curved although the substrate is made of a hard material, a thin glass substrate or quartz substrate is used as the electro-optical device substrate, and the substrate is curved along the curved surface of the first member. Therefore, it is possible to provide an electro-optical device having a curved display surface. In addition, since the electro-optical device substrate is a thin plate made of a hard material, such as a glass substrate or a quartz substrate, the electro-optical device substrate has high weather resistance and heat resistance. Thus, it is possible to realize an electro-optical device having a curved display surface with high reliability.

In the present invention, the electro-optical device substrate has a thickness of 250 μm or less, and more preferably, 50 μm or less.

The present invention can be also applied to a case in which the curved surface is a convexly curved surface or a concavely curved surface.

In the present invention, when the electro-optical device is a liquid crystal device, the electro-optical device substrate is formed by bonding two substrates with liquid crystal, which is the electro-optical material, held therebetween.

In the present invention, when the electro-optical device is an electro-luminescent display device, an electro-luminescent material, which is the electro-optical material, is held in the electro-optical device substrate.

In the present invention, the electro-optical device substrate and a second member are superposed on the curved surface of the first member in this order, and the second member is fixed to the first member at the outside of an outer circumference of the electro-optical device substrate in a state in which the outer circumference of the electro-optical device substrate is pressed against the first member, so that the electro-optical device substrate is maintained in a curved state. With such a structure, the electro-optical device substrate is not adhered and fixed to other members, such as polarizing plates. Therefore, when curving the electro-optical device substrate, a large stress is not directly transmitted from the electro-optical device substrate to the polarizing plate at the central part of the electro-optical device substrate used as an image display region. In addition, a large stress is not directly transmitted from the polarizing plate to the electro-optical device substrate. Thus, even when curving the electro-optical device substrate made of a hard material, defects do not occur in sheet-shaped optical components, such as the electro-optical device substrate and the polarizing plates superposed thereon. Further, when curving the electro-optical device substrate after the polarizing plate adheres to the electro-optical device substrate using an adhesive, the stress at that time is concentrated on the central part, which results in the separation of the polarizing plate, the lowering of the performance of the polarizing plate, the variation of the gap between substrates in a liquid crystal panel, etc. In addition, the electro-optical device substrate constituting the liquid crystal panel may split in the direction in which the stress is applied.

In the present invention, for example, when one or more sheet-shaped optical components are arranged on a surface of the electro-optical device substrate opposite to the first member, one of the sheet-shaped optical components can be fixed, serving as the second member, to the first member at the outside of the outer circumference of the electro-optical device substrate.

In the present invention, spacers are arranged between the first member and the outer circumference of the electro-optical device substrate and/or between the outer circumference of the electro-optical device substrate and the second member. Therefore, the electro-optical device substrate is maintained in a curved state between the first member and the second member such that a central region of the surface on which the spacers are arranged is not brought into planar contact with other members.

In the present invention, first spacers are arranged between the first member and the outer circumference of the electro-optical device substrate, and second spacers are arranged between the outer circumference of the electro-optical device substrate and the second member. Therefore, the electro-optical device substrate is maintained in a curved state between the first member and the second member such that central regions of both surfaces thereof are not brought into planar contact with other members.

In the present invention, for example, a base, which is the first member, a first polarizing plate, the first spacers, the electro-optical device substrate, the second spacers, and a second polarizing plate having an area larger than that of the electro-optical device substrate are superposed in this order. In this case, the first polarizing plate is arranged to curve along the curved surface of the base, and the electro-optical device substrate is arranged in the curved state on the first polarizing plate with the first spacers interposed therebetween. In addition, preferably, the second polarizing plate, which is the second member, is arranged in the curved state on the electro-optical device substrate with the second spacers interposed therebetween, and is fixed to the base at the outside of the outer circumference of the electro-optical device substrate. When the electro-optical device substrate closely adheres to the polarizing plate, Newton's ring (interference fringes) is generated, resulting in the deterioration of the image quality on the image display surface. However, if the spacers are arranged between the electro-optical device substrate and the polarizing plates to secure the gaps therebetween, the above problems can be avoided.

In the present invention, when a base, which is the first member, a first polarizing plate, the electro-optical device substrate, and a second polarizing plate having an area larger than that of the electro-optical device substrate are superposed in this order, a sheet having unevenness thereon is arranged between the first polarizing plate and the electro-optical device substrate and/or between the electro-optical device substrate and the second polarizing plate. In this case, preferably, the second polarizing plate, which is the second member, is fixed to the base at the outside of the outer circumference of the electro-optical device substrate, so that the first polarizing plate, the electro-optical device substrate, and the sheet having unevenness are maintained in the curved state along the curved surface. When the electro-optical device substrate closely adheres to the polarizing plate, Newton's ring (the interference fringes) is generated, resulting in the deterioration of the image quality on the image display surface. However, if the sheets having unevenness are arranged between the electro-optical device substrate and the polarizing plates, the above problems can be avoided.

In the present invention, preferably, the sheets having unevenness are arranged between the first polarizing plate and the electro-optical device substrate and between the electro-optical device substrate and the second polarizing plate, respectively.

In the present invention, when the electro-optical device further comprises a light source for emitting light toward the first member, the first member is made of a transmissive material, and is used as a light guide plate for transmitting light emitted from the light source toward the electro-optical device substrate through the curved surface, which is a light exit surface. When the electro-optical device is a transmissive or transflective liquid crystal device, a backlight unit is provide on the rear side of the liquid crystal panel. In this case, when the liquid crystal panel is curved, light emitted from the backlight unit is non-uniformly incident on the liquid crystal panel. As a result, a bright region and a dark region are formed on the image display surface of the electro-optical device. However, according to the present invention, since the first member is used as the light guide plate, uniform light can be emitted toward the entire surface of the electro-optical device substrate through the first member, which is the light guide plate. Therefore, it is possible to display a high-quality image without the bright region and the dark region on the image display surface of the electro-optical device.

In the present invention, preferably, the outer circumference of the electro-optical device substrate is pressed against the light guide plate by a member arranged on a surface of the electro-optical device substrate opposite to the first member, so that the electro-optical device substrate is maintained in a curved state. With such a structure, it is possible to curve the electro-optical device substrate so as not to be adhered or fixed to other members, such as the polarizing plates. Therefore, when curving the electro-optical device substrate, a large stress is not directly transmitted from the electro-optical device substrate to the polarizing plate at the central part of the electro-optical-device substrate used as an image display region. In addition, a large stress is not directly transmitted from the polarizing plate to the electro-optical device substrate. Thus, defects, such as the breakage and the lowering of the performance of the electro-optical device substrate or the polarizing plates, do not occur.

In the present invention, the light source emits light toward a light incident surface, which is the other surface of the first member opposite to the curved surface. In this case, the light incident surface of the first member is composed of a concavely curved surface, and the light source is arranged in a concave space defined by the light incident surface.

In the present invention, the light source is preferably arranged such that light can be incident on the light guide plate through a side end portion of the first member.

Further, the present invention provides a method of manufacturing an electro-optical device in which an electro-optical material is held in a sheet-shaped electro-optical device substrate made of a hard material. The method comprises a step of curving the electro-optical device substrate between a first member and a second member; and a step of fixing the second member to the first member at the outside of an outer circumference of the electro-optical device substrate to maintain the electro-optical device substrate in a curved state.

In the present invention, preferably, one or more sheet-shaped optical components are arranged on a surface of the electro-optical device substrate opposite to the first member, and one of the sheet-shaped optical components, serving as the second member, is fixed to the first member at the outside of the outer circumference of the electro-optical device substrate.

Furthermore, the electro-optical device according to the present invention is used for an electronic apparatus, such as a display device.

DETAILED DESCRIPTION OF PREFERRED EMBODIMENTS

[First Embodiment]
(Basic Structure of Electro-optical Device)

Figure 1A:
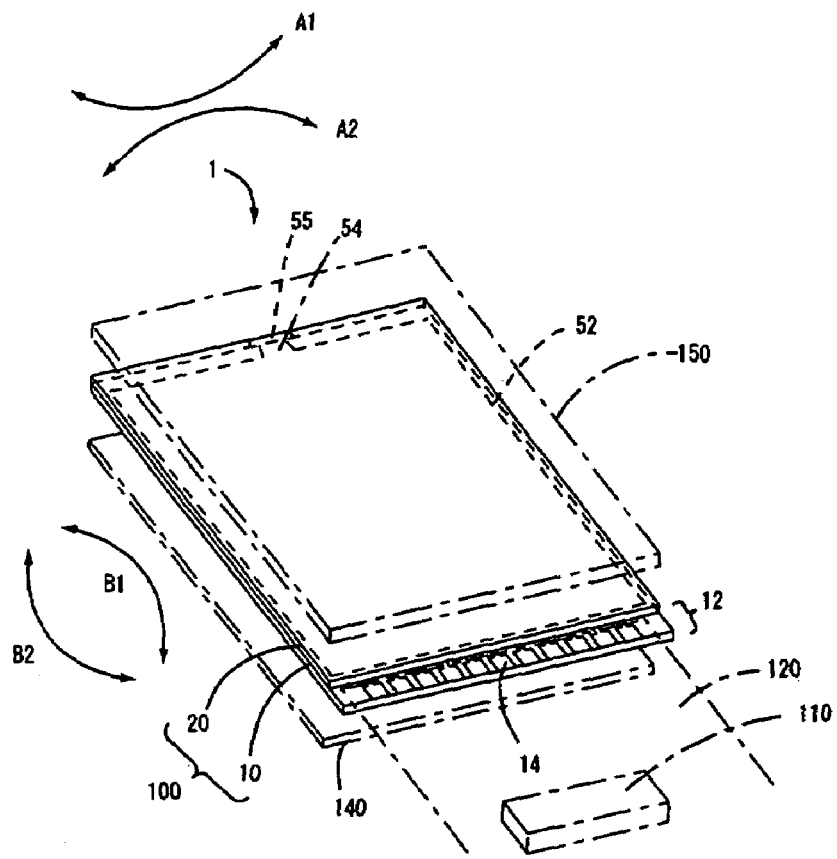
FIGS. 1(A) and 1(B) are a view and a cross-sectional view illustrating the structure of an electro-optical device according to the first embodiment of the present invention as seen from a counter substrate side.
Figure 1B:
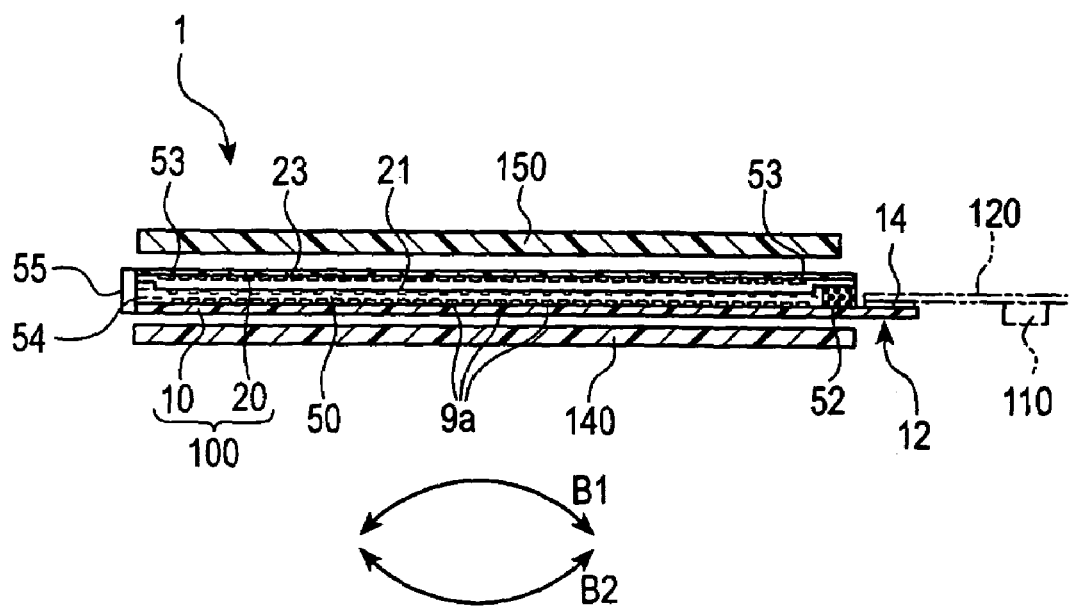
Figure 2:
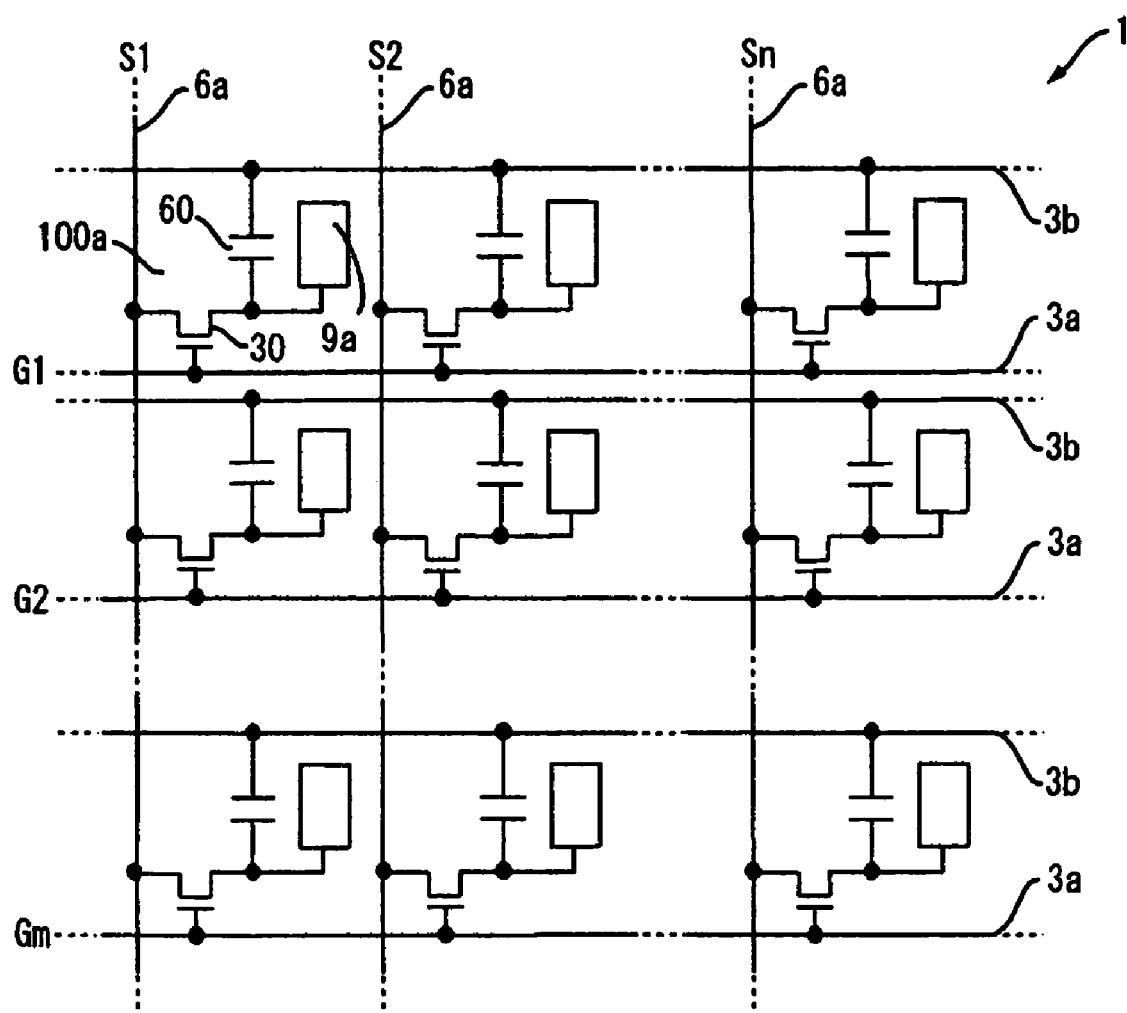
FIG. 2 is an equivalent circuit diagram for various elements and wiring lines of a plurality of pixels arranged in a matrix in an image display region of the electro-optical device shown in FIG. 1.

FIG. 1(A) is a view illustrating the structure of an electro-optical device according to the present invention as seen from the counter substrate side, and FIG. 1(B) is a cross-sectional view thereof. FIG. 2 is an equivalent circuit diagram for various elements and wiring lines of a plurality of pixels that is arranged in a matrix in an image display region of the electro-optical device. In the drawings used for explaining the present invention, since each layer or each member is scaled to be recognizable in the drawings, the reduced scale of each layer or each member differs from the actual scale thereof.

In FIGS. 1(A) and 1(B), an electro-optical device 1 according to the first embodiment comprises a transmissive or transflective active matrix liquid crystal panel 100. In the liquid crystal panel 100, liquid crystal 50, which is an electro-optical material, is held between a TFT array substrate 10 (an electro-optical device substrate) and a counter substrate 20 (an electro-optical device substrate) which are bonded to each other by a sealing material 52 applied in the shape of a rectangular frame. Inside the sealing material 52, a peripheral partition 53 made of a light-shielding material is formed along the sealing material 52. In the present embodiment, the TFT array substrate 10 is larger than the counter substrate 20, and a plurality of terminals 14 is formed along one side of the TFT array substrate 10 in a protruding region 12 projecting from the counter substrate 20. A flexible substrate 120 on which a driving IC 110 is mounted in a COF (Chip on Film) manner is connected to these terminals 14. In addition, in stead of the flexible substrate 120 on which the driving IC 110 is mounted in the COF manner, a data line driving circuit and a scanning line driving circuit may be formed on the TFT array substrate 10, or the driving IC 110 may be mounted on the TFT array substrate 10 in a COG (Chip on Glass) manner. In any case, terminals are formed on the protruding region 12 of the TFT array substrate 10.

Pixel electrodes 9a are formed in a matrix on the TFT array substrate 10. On the counter substrate 20, a light-shielding film 23, which is called black matrix or black stripe, is formed at regions opposite to the longitudinal and lateral boundary regions of the pixel electrodes 9a on the TFT array substrate 10, and a counter electrode 21 composed of an ITO film is formed on the upper layer of the light-shielding film 23. Further, when the electro-optical device 1 is constituted for color display, R, G, and B color filters are further formed on the counter substrate 20 together with a protective film for protecting the surfaces of the filters so as to be opposite to the respective pixel electrodes of the TFT array substrate 10.

In the electro-optical device 1, a retardation film or a polarizing plate is arranged in a predetermined direction according to the type of the liquid crystal 50 to be used, i.e., an operational mode, such as a twisted nematic (TN) mode and a super twisted nematic (STN) mode, and a distinction between a normally white mode and a normally black mode. However, in the present embodiment, only a first polarizing plate 140 and a second polarizing plate 150 are shown.

In the image display region of the electro-optical device 1 having the above-mentioned structure, as shown in FIG. 2, a plurality of pixels 100a is formed in a matrix. These pixels 100a each has a pixel electrode 9a and a pixel switching TFT 30 (a thin film semiconductor element) for driving the pixel electrode 9a, and a source of the TFT 30 is electrically connected to a data line 6a through which pixel signals S1, S2, . . . , Sn are supplied. The pixel signals S1, S2, . . . , Sn to be written to the data lines 6a may be supplied in this order and in the sequence of the data lines. Further, adjacent ones of the plurality of data lines 6a may be grouped to supply the pixel signals for each of the groups. A gate of the TFT 30 is electrically connected to a scanning line 3a. Scanning signals G1, G2, . . . , Gm are applied to the scanning lines 3a in a pulse form at a predetermined timing in this order and in the sequence of the scanning lines. The pixel electrode 9a is electrically connected to a drain of the TFT 30. Turning on the TFT 30, which is a switching element, only for a certain period of time can cause the pixel signals S1, S2, . . . , Sn supplied through the data line 6a to be written to the corresponding pixel at a predetermined timing. The pixel signals S1, S2, . . . , Sn at a predetermined level, which have been written to the liquid crystal 50 through the pixel electrodes 9a, are held between the pixel electrodes and the counter electrode 21 of the counter substrate 20 shown in FIG. 1(B) for a certain period of time.

The liquid crystal 50 changes its molecular arrangement and order according to a voltage level applied thereto, which causes light to be modulated and enables grayscale display. In a normally white mode, the transmittance of incident light when passing through the liquid crystal 50 decreases according to the applied voltage. On the other side, in a normally black mode, the transmittance of incident light when passing through the liquid crystal 50 increases according to the applied voltage. As a result, light having the contrast corresponding to the pixel signals S1, S2, . . . , Sn is emitted from the electro-optical device 1 as a whole.

Further, in order to prevent the held pixel signals S1, S2, . . . , Sn from leaking, storage capacitors 60 are additionally provided in parallel to liquid crystal capacitors formed between the pixel electrodes 9a and the counter electrode 21. For example, the voltage of the pixel electrode 9a is maintained by the storage capacitor 60 (a thin film capacitor element) for a time three digits longer than the time when a source voltage is applied. Therefore, it is possible to improve electric charge holding characteristics and thus to realize an electro-optical device 1 having a high contrast ratio. Further, in a method of forming the storage capacitor 60, as shown in FIG. 2, the storage capacitor 60 can be formed between the liquid crystal capacitor and a capacitive line 3b, which is a wiring line for forming the storage capacitors 60, or a preceding scanning line 3a.

Figure 3A:
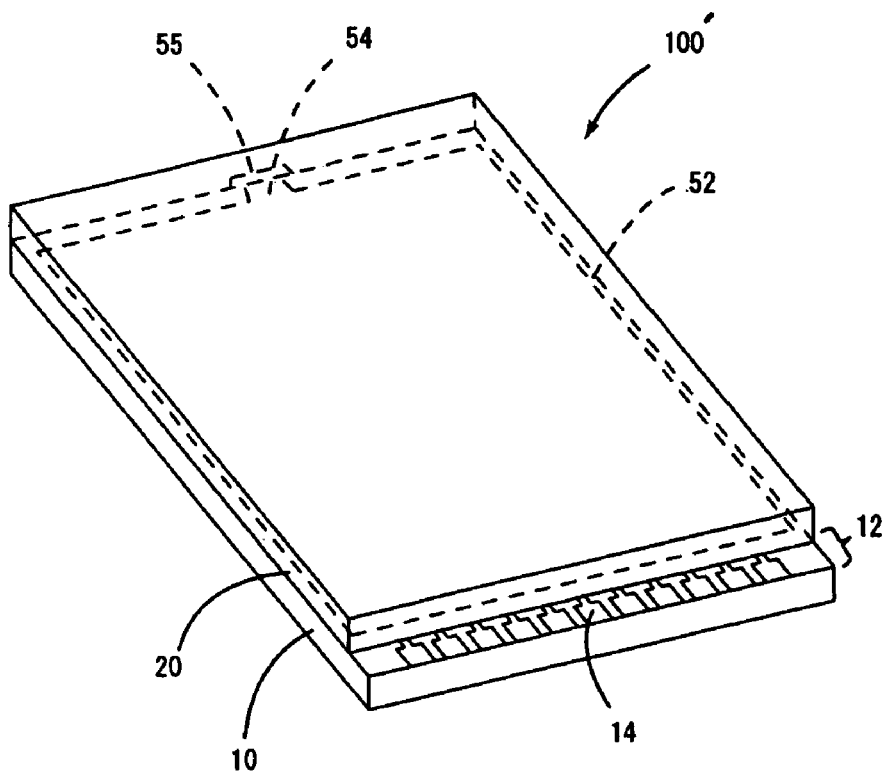
FIGS. 3(A) and 3(B) are a plan view and a cross-sectional view of an intermediate product of the electro-optical device shown in FIG. 1 as seen from the counter substrate side.
Figure 3B:
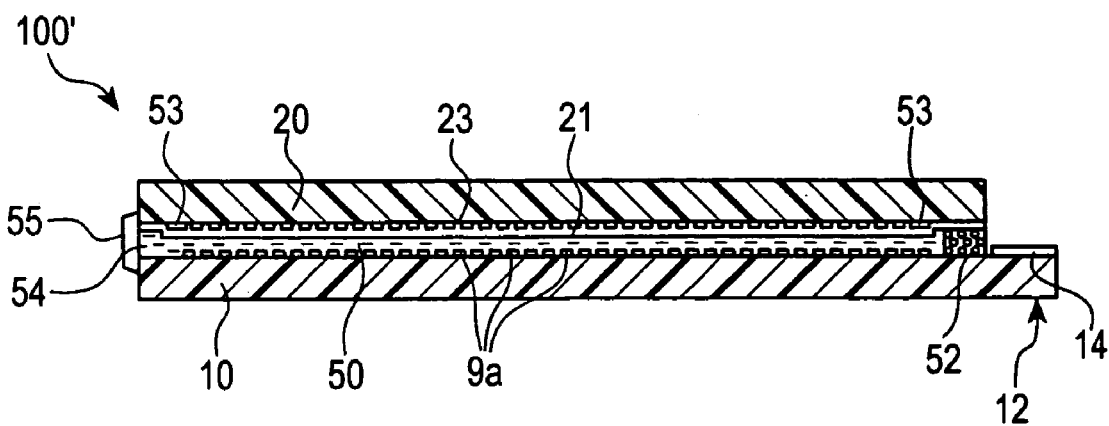

In the electro-optical device 1 of the present embodiment, the TFT array substrate 10 and the counter substrate 20 each are formed of a glass substrate or a quartz substrate (a hard material) having an extremely thin thickness of less than 250 µm, and preferably, 50 µm or less. As such, the electro-optical device 1 is formed of a thin substrate. Therefore, according to the present embodiment, as shown in FIGS. 3(A) and 3(B), an intermediate product 100' of the electro-optical device 1 is manufactured using the TFT array substrate 10 and the counter substrate 20 each having a thickness of about 0.5 mm, and then the TFT array substrate 10 and the counter substrate 20 each gets thin down to a predetermined thickness of, for example, 25 µm by a polishing process or an etching process. Further, when manufacturing the electro-optical device 1, various wiring lines are formed on a large-sized original substrate that can be divided into a plurality of the TFT array substrates 10 and the counter substrates 20 by semiconductor processes. Herein, a polishing process and an etching process may be performed in a state in which the original substrates are bonded to each other or in the state of a single liquid crystal panel 100.

(Detailed Structure of Electro-Optical Device)

In the electro-optical device 1 according to the present embodiment, since both the TFT array substrate 10 and the counter substrate 20 constituting the liquid crystal panel 100 are thin, the liquid crystal panel 100 is flexible in the direction of arrow A1 or A2 and in the direction of arrow B1 or B2 as shown in FIGS. 1(A) and 1(B). For example, a structure in which the liquid crystal panel 100 is bent in the direction of arrow B1 to form a curved surface will be described with reference to FIG. 4.

Figure 4:
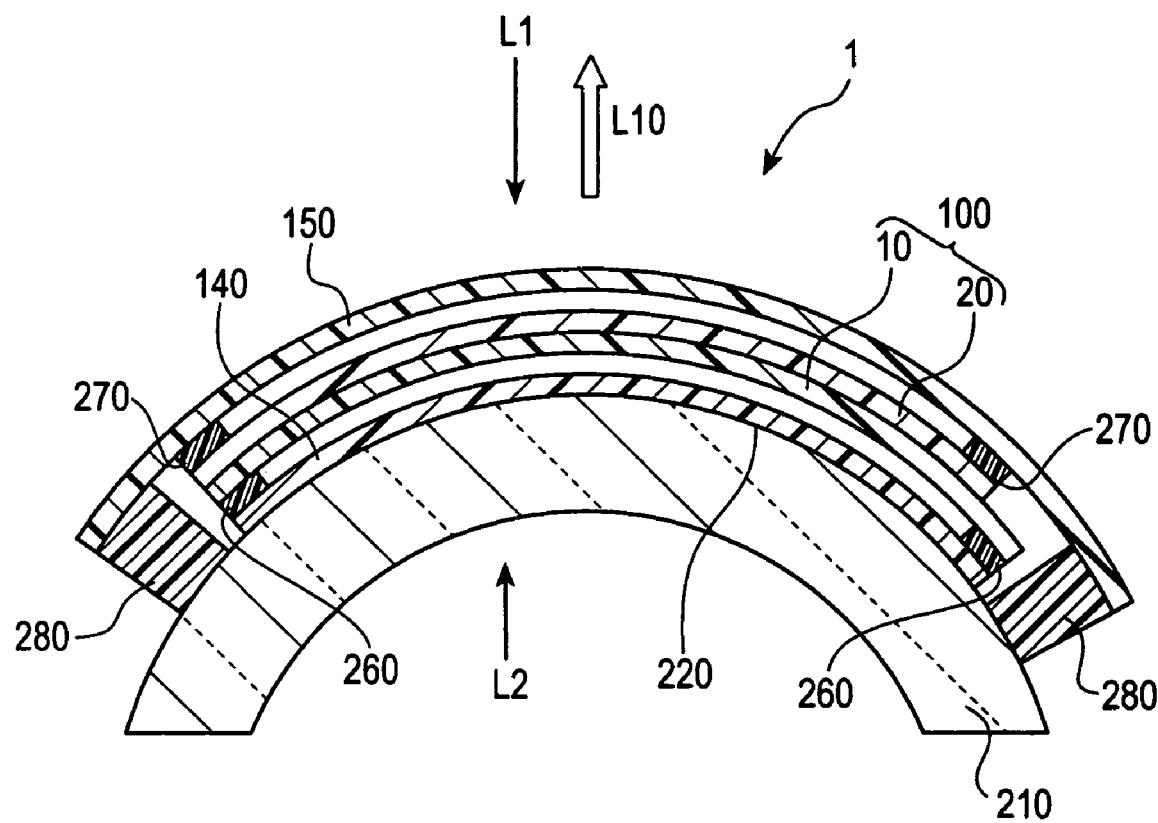
FIG. 4 is a cross-sectional view illustrating the structure of the electro-optical device according to the first embodiment of the present invention.

FIG. 4 is a cross-sectional view illustrating the structure of the electro-optical device according to the first embodiment of the present invention.

As shown in FIG. 4, in the present embodiment, a base 210 (a first member) having a convexly curved surface 220, a first polarizing plate 140 having a thickness of 300 µm to 400 µm, first spacers 260, the liquid crystal panel 100 comprising the TFT array substrate 10 and the counter substrate 20, second spacers 270, and a second polarizing plate 150 (a second member/a sheet-shaped optical component) having an area larger than that of the TFT array substrate 10 and a thickness of 300 µm to 400 µm are superposed in this order.

Herein, the first polarizing plate 140 is arranged so as to curve along the curved surface 220 of the base 210. The liquid crystal panel 100 (the TFT array substrate 10 and the counter substrate 20) is arranged so as to curve with the first spacers 260 interposed between its outer circumferential side and the first polarizing plate 140. The second polarizing plate 150 is arranged so as to curve along the surface of the liquid crystal panel 100 with the second spacers 270 interposed therebetween at the outer circumferential side of the liquid crystal panel 100. In addition, the second polarizing plate 150 is fixed to the base 210 by an adhesive 280, such as a double-faced tape, at the outside of the outer circumference of the liquid crystal panel 100.

In manufacturing the electro-optical device 1 having the above-mentioned structure, the liquid crystal panel 100 is curved between the base 210 and the second polarizing plate 150. In this state, the second polarizing plate 150 is fixed to the base 210 by the double-faced tape 280 at the outside of the outer circumference of the liquid crystal panel 100, thereby maintaining the liquid crystal panel 100 in a curved state.

That is, the first polarizing plate 140, the first spacers 260, the liquid crystal panel 100, the second spacers 270, and the second polarizing plate 150 are superposed on the base 210 in this order, and then the outer circumference of the second polarizing plate 150 is pressed against the base 210 while being curved along the curved surface 220 of the base 210. As a result, the first polarizing plate 140 and the liquid crystal panel 100 are pressed against the curved surface 220 of the base 210 in a curved state with the spacers 260 and 270 interposed therebetween, and this state is maintained by fixing the second polarizing plate 150 to the base 210 using the double-faced tape 280.

Further, if the positions of the spacers 260 and 270 or the fixing places of the second polarizing plate 150 to the base 210 include two places sandwiching the curved portion of the liquid crystal panel 100 at both ends thereof, the positions or the fixing places are a portion of or the entire circumference of the liquid crystal panel 100.

The electro-optical device 1 having the above-mentioned structure displays images with the side where the second polarizing plate 150 is arranged used as a display surface. Herein, when the liquid crystal panel 100 is a transmissive type, light (which is indicated by arrow L2 in FIG. 4) emitted from a backlight unit is optically modulated in the liquid crystal panel 100, and then exits therefrom as display light (which is indicated by arrow L10). On the other side, when the liquid crystal panel 100 is a transflective type, external light (which is indicated by arrow L1 in FIG. 4) and light (which is indicated by the arrow L2 in FIG. 4) emitted from the backlight unit are optically modulated in the liquid crystal panel 100, and then exit therefrom as display light (which is indicated by the arrow L10 in FIG. 4). Therefore, in both cases, the base 210 is made of a transmissive material.

Furthermore, when the liquid crystal panel 100 is a reflective type, external light (which is indicated by arrow L1 in FIG. 4) is optically modulated in the liquid crystal panel 100, and then exits therefrom as display light (which is indicated by the arrow L10 in FIG. 4). Therefore, in this case, the first polarizing plate 140 is not needed. In addition, the base 210 may be made of a transmissive material or a non-transmissive material.

(Effect of the Present Embodiment)

As described above, according to the present embodiment, from the fact that a sheet-shaped substrate can be curved although the substrate is a thin glass substrate or quartz substrate made of a hard material, when forming the electro-optical device 1 having a curved display surface, a thin glass substrate or quartz substrate is used as an electro-optical device substrate to curve along the curved surface 220 of the base 210. Thus, it is possible to provide the electro-optical device 1 having a curved display surface. Further, since the electro-optical device substrate is a thin plate made of a hard material, such as a glass substrate or a quartz substrate, it has high heat resistance and weather resistance. Thus, it is possible to realize the electro-optical device 1 having a curved display surface with high reliability.

Further, in the present embodiment, the second polarizing plate 150 is fixed to the base 210 by the adhesive 280, such as a double-faced tape, at the outside of the outer circumference of the liquid crystal panel 100. Therefore, the liquid crystal panel 100 can be curved without being adhered and fixed to other members, such as the first and second polarizing plates 140 and 150. Thus, when the liquid crystal panel 100 is curved, a large stress is not directly transmitted from the liquid crystal panel 100 to the polarizing plates 140 and 150 at the central part used as an image display region since clearances are secured between the first polarizing plate 140 and the liquid crystal panel 100 and between the second polarizing plate 150 and the liquid crystal panel 100. In addition, a large stress is not directly transmitted from the polarizing plates 140 and 150 to the liquid crystal panel 100. As a result, in the liquid crystal panel 100, defects, such as a variation in the gap between substrates or the damage of substrates, do not occur, and the polarization characteristics of the polarizing plates 140 and 150 are not changed.

Furthermore, the liquid crystal panel 100 is maintained in a curved state between the base 210 and the second polarizing plate 150 such that its central region is not brought into planar contact with other members (the polarizing plates 140 and 150) by the spacers 260 and 270 interposed therebetween. In other words, since gaps are secured between the central region of the liquid crystal panel 100 and the first and second polarizing plates 140 and 150, respectively, it is possible to prevent the generation of Newton's ring.

Moreover, in the present embodiment, the spacers 260 and 270 are arranged between the liquid crystal panel 100 and the first and second polarizing plates 140 and 150, respectively. However, when a sheet having unevenness thereon is arranged between the liquid crystal panel 100 and one of the first and second polarizing plates 140 and 150, the spacers may be arranged only at one side. Herein, the sheet having unevenness functions to scatter or diffuse light.

[Second Embodiment]

Figure 5:
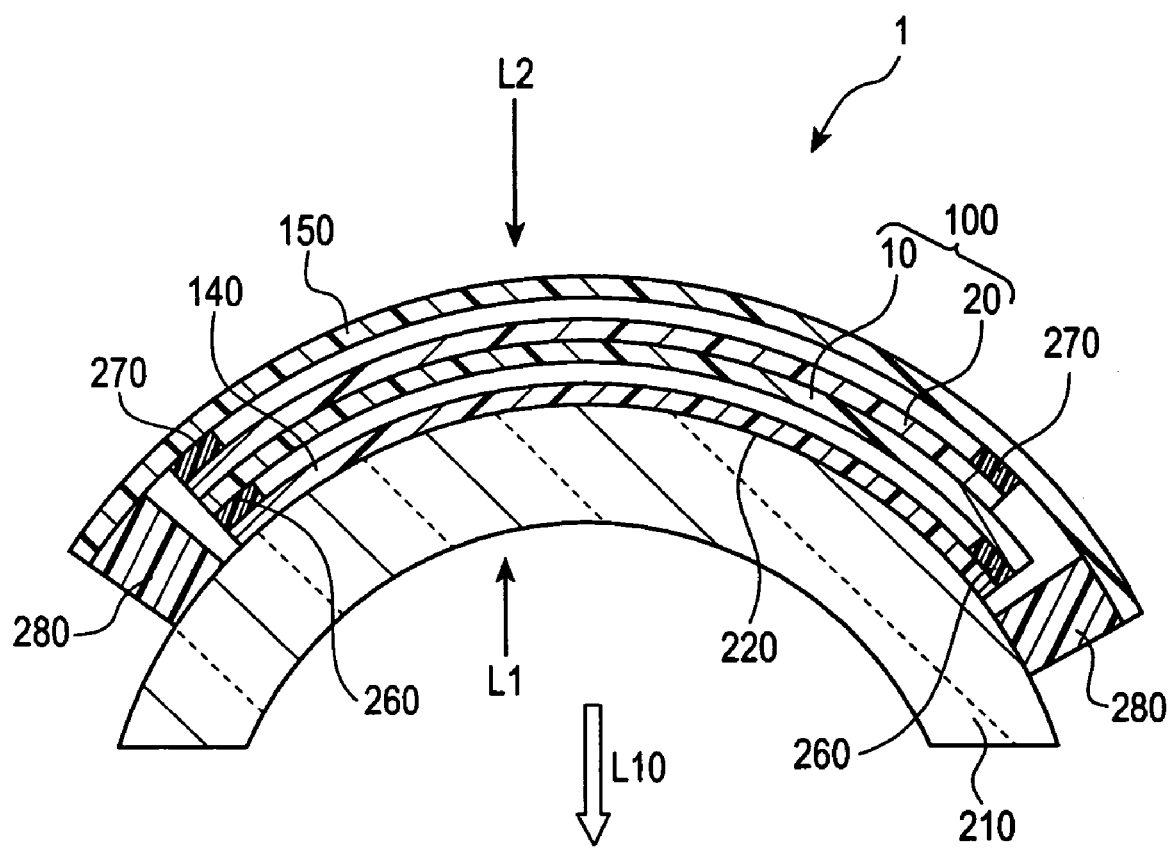
FIG. 5 is a cross-sectional view illustrating the structure of an electro-optical device according to a second embodiment of the present invention.

FIG. 5 is a cross-sectional view illustrating the structure of an electro-optical device according to the second embodiment of the present invention. In the present embodiment and other embodiments to be described later, since their basic structures are the same as that in the first embodiment, components having the same function are represented by the same reference numeral, and thus a description thereof will be omitted.

In FIG. 5, the structure of an electro-optical device 1 according to the present embodiment is equal to that in the first embodiment, except that the side of the base 210 is used as a display surface. In the electro-optical device 1 having such a structure, when the liquid crystal panel 100 is a transmissive type, light (which is indicated by arrow L2) emitted from a backlight unit is optically modulated in the liquid crystal panel 100, and then exits therefrom as display light (which is indicated by arrow L10). On the other side, when the liquid crystal panel 100 is a transflective type, external light (which is indicated by arrow L1) and light (which is indicated by the arrow L2) emitted from the backlight unit are optically modulated in the liquid crystal panel 100, and then exit therefrom as display light (which is indicated by the arrow L10). Therefore, in the case of the present embodiment, the base 210 is made of a transmissive material.

[Third Embodiment]

In the first embodiment, the spacers 260 and 270 are respectively arranged between the liquid crystal panel 100 and the first and second polarizing plates 140 and 150. However, in the present embodiment, as described below, sheets having unevenness thereon are used instead of the spacers 260 and 270 in order to prevent the generation of Newton's ring.

Figure 6:
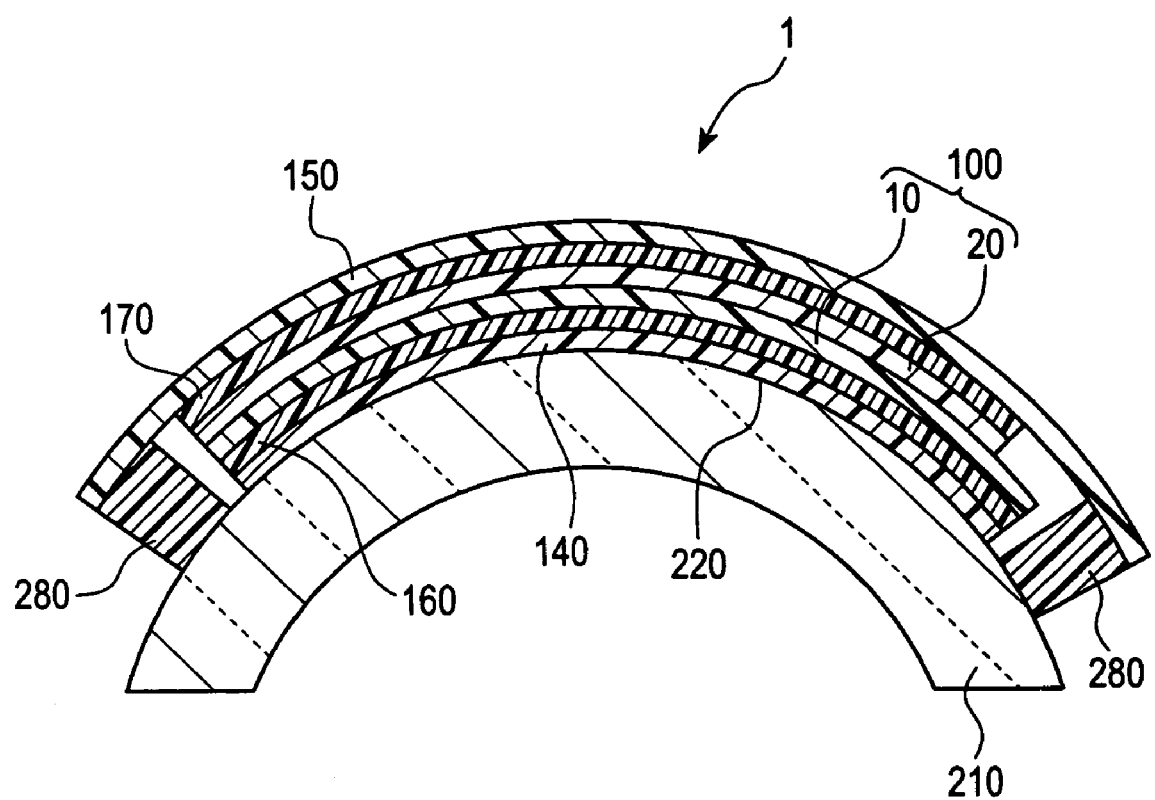
FIG. 6 is a cross-sectional view illustrating the structure of an electro-optical device according to a third embodiment of the present invention.

FIG. 6 is a cross-sectional view illustrating the structure of an electro-optical device according to the third embodiment of the present invention.

As shown in FIG. 6, in an electro-optical device 1 of the present embodiment, a base 210 having a curved surface 220, a first polarizing plate 140, a liquid crystal panel 100, and a second polarizing plate 150 having an area larger than that of the liquid crystal panel 100 are superposed in this order. In addition, a first sheet 160 having unevenness is arranged between the first polarizing plate 140 and the liquid crystal panel 100, and a second sheet 170 having unevenness is arranged between the liquid crystal panel 100 and the second polarizing plate 150.

Herein, the second polarizing plate 150 is fixed to the base by an adhesive 280, such as a double-faced tape, at the outside of the outer circumference of the liquid crystal panel 100, so that the first polarizing plate 140, the liquid crystal panel 100, and the sheets 160 and 170 each having unevenness are maintained in a curved state along the curved surface 220.

Also, in such a structure, similarly to the first embodiment, it is possible to curve the liquid crystal panel 100 without being adhered and fixed to other members, such as the first and second polarizing plates 140 and 150.

Further, in the present embodiment, since the sheets 160 and 170 each having unevenness are respectively arranged between the first polarizing plate 140 and the liquid crystal panel 100 and between the liquid crystal panel 100 and the second polarizing plate 150, it is possible to prevent the deterioration of image quality due to the generation of Newton's ring.

Furthermore, in the present embodiment, the sheets 160 and 170 each having unevenness are arranged between the first polarizing plate 140 and the liquid crystal panel 100 and between the liquid crystal panel 100 and the second polarizing plate 150, respectively. However, if necessary, only one of the sheets 160 and 170 may be arranged between the first polarizing plate 140 and the liquid crystal panel 100 or between the liquid crystal panel 100 and the second polarizing plate 150.

[Fourth Embodiment]

Figure 7:
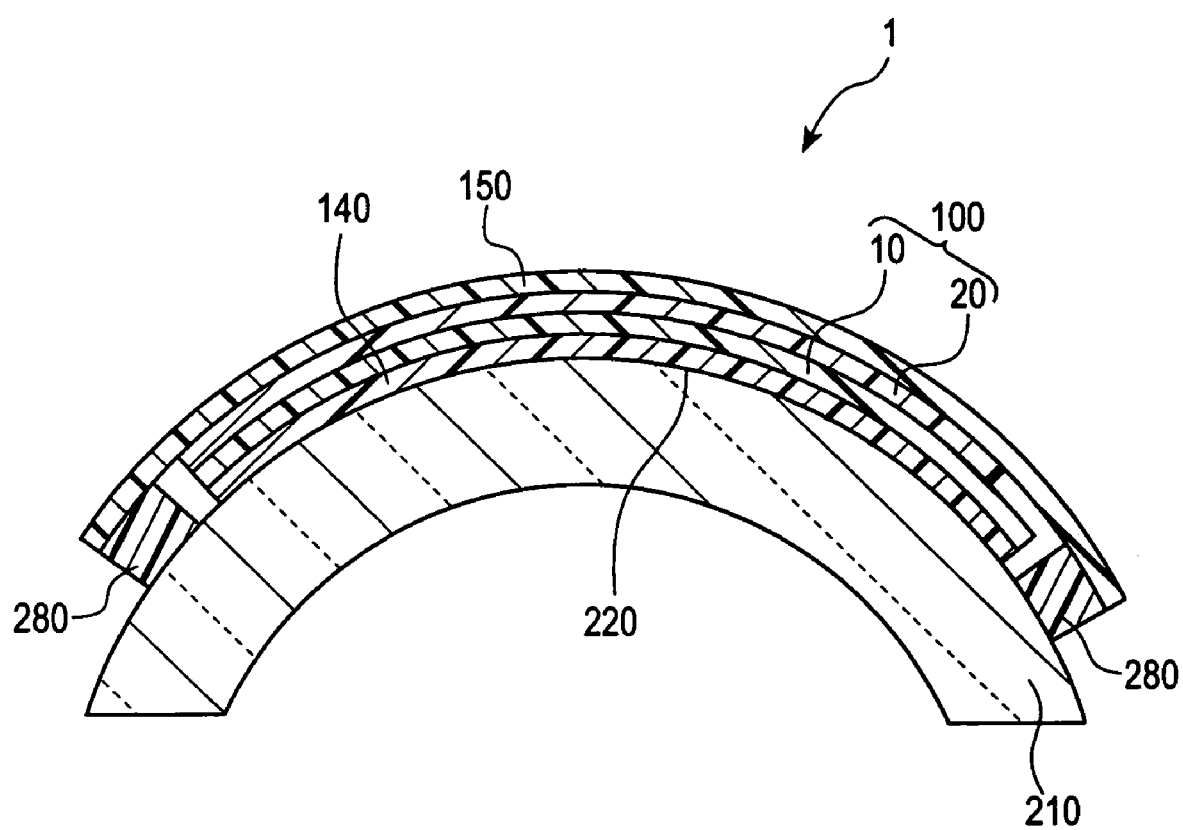
FIG. 7 is a cross-sectional view illustrating the structure of an electro-optical device according to a fourth embodiment of the present invention.

The structure shown in FIG. 7 can be used from the viewpoint of curving the liquid crystal panel 100 so as not to adhere and be fixed to other members, such as the polarizing plates 140 and 150.

FIG. 7 is a cross-sectional view illustrating the structure of an electro-optical device according to the fourth embodiment of the present invention.

As shown in FIG. 7, in an electro-optical device 1 of the present embodiment, a base 210 having a curved surface 220, a first polarizing plate 140, a liquid crystal panel 100, and a second polarizing plate 150 having an area larger than that of the liquid crystal panel 100 are superposed in this order. In addition, the second polarizing plate 150 is fixed to a base 210 by an adhesive 280, such as a double-faced tape, at the outside of the outer circumference of the liquid crystal panel 100, so that the first polarizing plate 140 and the liquid crystal panel 100 are maintained in a curved state along the curved surface 220.

[Fifth Embodiment]

In the above-mentioned embodiments, the base 210 having the convexly curved surface 220 is used. However, as shown in FIG. 8, the base 210 may have a concavely curved surface 230.

Figure 8:
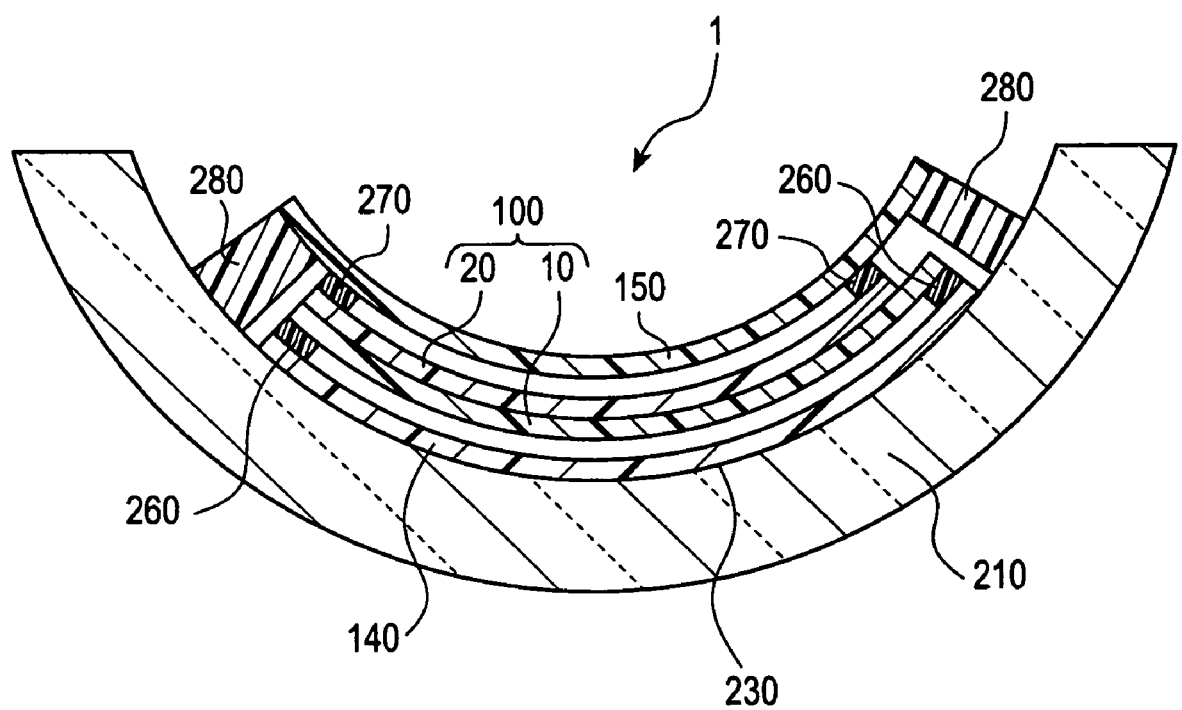
FIG. 8 is a cross-sectional view illustrating the structure of an electro-optical device according to a fifth embodiment of the present invention.

FIG. 8 is a cross-sectional view illustrating the structure of an electro-optical device according to the fifth embodiment of the present invention.

As shown in FIG. 8, in an electro-optical device 1 of the present embodiment, a base 210 (a first member) having the convexly curved surface 230, a first polarizing plate 140, first spacers 260, a liquid crystal panel 100 comprising the TFT array substrate 10 and a counter substrate 20, second spacers 270, and a second polarizing plate 150 (a second member/a sheet-shaped optical component) having an area larger than that of the TFT array substrate 10 are superposed in this order.

Herein, the first polarizing plate 140 is arranged so as to curve along the curved surface 230 of the base 210. The liquid crystal panel 100 (the TFT array substrate 10 and the counter substrate 20) is arranged so as to curve with the first spacers 260 interposed between its outer circumferential side and the first polarizing plate 140. The second polarizing plate 150 is arranged in a curved state on the liquid crystal panel 100 with the second spacers 270 interposed therebetween at the outer circumferential side of the liquid crystal panel 100. In addition, the second polarizing plate 150 is fixed to the base 210 by an adhesive 280, such as a double-faced tape, at the outside of the outer circumference of the liquid crystal panel 100. In this way, the first polarizing plate 140 and the liquid crystal panel 100 are maintained in a curved state.

Also, in such a structure, the electro-optical device 1 having a curved display surface can be constituted such that the liquid crystal panel 100 is curved without being adhered and fixed to other members, such as the first and second polarizing plates 140 and 150. Thus, when the liquid crystal panel 100 is curved, a large stress is not directly transmitted from the liquid crystal panel 100 to the polarizing plates 140 and 150 at the central part used as an image display region. In addition, a large stress is not directly transmitted from the polarizing plates 140 and 150 to the liquid crystal panel 100. Therefore, unnecessary gaps do not occur between the liquid crystal panel 100 and the first and second polarizing plates 140 and 150. As a result, in the liquid crystal panel 100, defects, such as a variation in the gap between substrates or the damage of the substrates, do not occur, and the polarization characteristics of the polarizing plates 140 and 150 are not changed, which is the same effects as those in the first embodiment.

Further, according to the present embodiment, the base 210 having the concavely curved surface is used instead of the base 210 having the convexly curved surface in the first embodiment. Similarly, the structure of the base 210 having the concavely curved surface 230 of the present embodiment may also be applied to the second and fourth embodiments.

[Sixth Embodiment]

Hereinafter, an example will be explained in which a base 210 (a first member) is used as a light guide plate of a backlight unit for a transmissive or transflective active matrix liquid crystal panel 100.

In an electro-optical device 1 of the present embodiment, as described with reference to FIGS. 3(A) and 3(B), an intermediate product 100' of the electro-optical device 1 is manufactured using a TFT array substrate 10 and a counter substrate 20 each having a thickness of about 0.5 mm, and then the TFT array substrate 10 and the counter substrate 20 each thin down to a predetermined thickness of, for example, 25 μm by a polishing process or an etching process. Also, in the electro-optical device 1 of the present embodiment, since the TFT array substrate 10 and the counter substrate 20 constituting the liquid crystal panel 100 are thin, the liquid crystal panel 100 can be curved in the direction of arrow A1 or A2 and in the direction of arrow B1 or B2 shown in FIGS. 1(A) and 1(B). Herein, a structure in which the liquid crystal panel 100 is curved, for example, in the direction of arrow B1 to form a curved display surface will be described with reference to FIG. 9.

Figure 9:
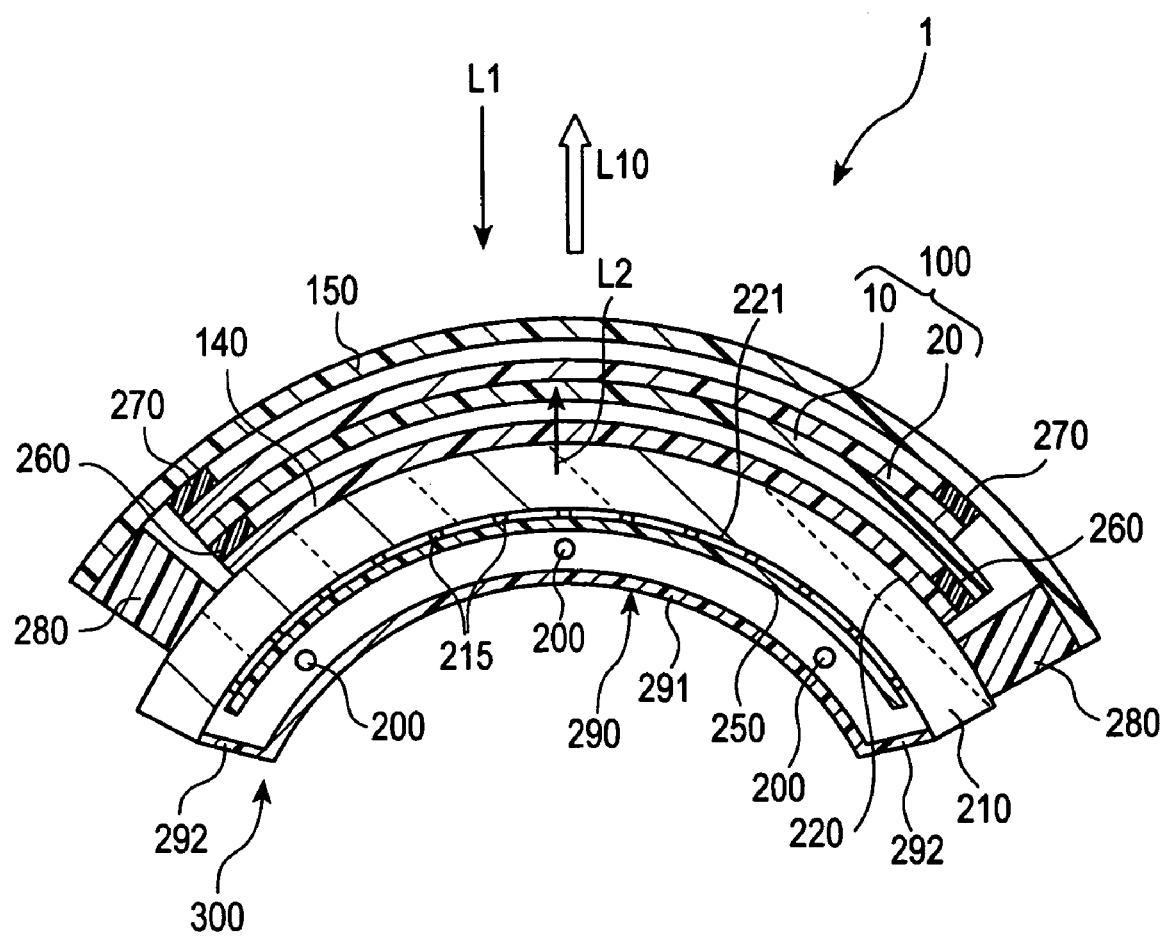
FIG. 9 is a cross-sectional view illustrating the structure of an electro-optical device according to a sixth embodiment of the present invention.

FIG. 9 is a cross-sectional view illustrating the structure of an electro-optical device according to the sixth embodiment of the present invention.

As shown in FIG. 9, in an electro-optical device 1 of the present embodiment, a backlight unit 300 is provided on the rear side of the liquid crystal panel 100. In the present embodiment, the backlight unit 300 comprises a transmissive base 210 (a light guide plate) having a convexly curved surface 220 (a light exit surface), a plurality of light sources 200 each composed of a cold cathode fluorescent lamp that is arranged on the rear side of the base 210 for emitting light toward a light incident surface 221, which is the other side of the base 210, and a reflector 290 for covering the rear sides of these light sources 200.

The light incident surface 221 of the base 210 is formed of a concavely curved surface in accordance with the shape of the convexly curved surface 220, which is a light exit surface, and the light sources 200 are arranged in a concave space defined by the concavely curved surface. In addition, the reflector 290 comprises a portion 291 that is opposite to the light incident surface 221 of the base 210 and has a curved surface in accordance with the concavely curved surface of the light incident surface 221 of the base 210, and bent portions 292 formed by bending both ends of the curved surface portion 291. The space in which the light sources 200 are arranged is covered with the reflector 290 on three sides.

A processing 215, such as an embossing process, dot printing, dot forming, or minute prism forming, is performed on the light incident surface 221 of the base 210 in order to obtain uniform brightness and to improve brightness. A sheet-shaped optical component 250, such as a prism sheet or a diffuser sheet, is arranged between the light sources 200 and the light incident surface 221 of the base 210.

Further, in the electro-optical device 1 of the present embodiment, the first polarizing plate 140 having a thickness of 300 μm to 400 μm, the first spacers 260, the liquid crystal panel 100 comprising the TFT array substrate 10 and the counter substrate 20, the second spacers 270, and the second polarizing plate 150 having an area larger than that of the TFT array substrate 10 and a thickness of 300 μm to 400 μm are superposed in this order on the curved surface 220 of the base 210.

The first polarizing plate 140 is arranged so as to curve along the curved surface 220 of the base 210. The liquid crystal panel 100 (the TFT array substrate 10 and the counter substrate 20) is arranged so as to curve with the first spacers 260 interposed between its outer circumferential side and the first polarizing plate 140. The second polarizing plate 150 is arranged in a curved state on the liquid crystal panel 100 with the second spacers 270 interposed therebetween at the outer circumferential side of the liquid crystal panel 100. In addition, the second polarizing plate 150 is fixed to the base 210 by an adhesive 280, such as a double-faced tape, at the outside of the outer circumference of the liquid crystal panel 100, so that the first polarizing plate 140 and the liquid crystal panel 100 are maintained in a curved state. Thus, the liquid crystal panel 100 is maintained in the curved state along the curved surface 220 of the base 210.

When the electro-optical device 1 having the above-mentioned structure is manufactured, the first polarizing plate 140, the first spacers 260, the liquid crystal panel 100, the second spacers 270, and the second polarizing plate 150 are superposed: in this order on the curved surface 220 of the base 210, and then the outer circumference of the second polarizing plate 150 is pressed against the base 210 while the second polarizing plate 150 is being curved along the curved surface 220 of the base 210. As a result, the first polarizing plate 140 and the liquid crystal panel 100 are pressed against the curved surface 220 of the base 210 in the curved state with the spacers 260 and 270 interposed therebetween, and this state is maintained by fixing the second polarizing plate 150 to the base 210 using the double-faced tape 280.

Further, if the positions of the spacers 260 and 270 or the fixing places of the second polarizing plate 150 to the base 210 include two places sandwiching the curved portion of the liquid crystal panel 100 at its both ends, the positions or the fixing places are a portion of or the entire circumference of the liquid crystal panel 100.

In the electro-optical device 1 having the above-mentioned structure, light emitted from the light source 200 is directly incident on the base 210 through the light incident surface 221 of the base 210, or is reflected by the reflector 290 and is then incident on the base 210 through the light incident surface 221 of the base 210. Then, the light travels from the curved surface 220 to the liquid crystal panel 100. Therefore, when the liquid crystal panel 100 is a transmissive type, light (which is indicated by arrow L2) emitted from a backlight unit 300 is optically modulated in the liquid crystal panel 100, and then exits therefrom as display light (which is indicated by arrow L10). On the other side, when the liquid crystal panel 100 is a transflective type, external light (which is indicated by arrow L1) and light (which is indicated by the arrow L2) emitted from the backlight unit are optically modulated in the liquid crystal panel 100, and then exit therefrom as display light (which is indicated by the arrow L10).

As described above, according to the present embodiment, the curved surface 220 of the base 210 of the backlight unit 300 is used as a light exit surface, and the liquid crystal panel 100 is curved based on the curved shape of the curved surface 220. Therefore, it is possible to emit uniform light from the backlight unit 300 toward the entire surface of the liquid crystal panel 100 through the base 210. As a result, since a bright region and a dark region are not formed on the image display surface of the electro-optical device 1, it is possible to display a high-quality image thereon.

Furthermore, in the present embodiment, the liquid crystal panel 100 is curved without being adhered and fixed to other members, such as the first and second polarizing plates 140 and 150. Therefore, when curving the liquid crystal panel 100, a large stress is not directly transmitted from the liquid crystal panel 100 to the polarizing plates 140 and 150 at the central part used as an image display region since clearances are secured between the liquid crystal panel 100 and the first and second polarizing plates 140 and 150, respectively. In addition, a large stress is not directly transmitted from the polarizing plates 140 and 150 to the liquid crystal panel 100. As a result, in the liquid crystal panel 100, defects, such as a variation in the gap between substrates and the damage of the substrates, do not occur, and the polarization characteristics of the polarizing plates 140 and 150 are not changed.

Moreover, the liquid crystal panel 100 is maintained in a curved state between the base 210 and the second polarizing plate 150 such that its central region is not brought into planar contact with other members (the polarizing plates 140 and 150) by the spacers 260 and 270 interposed therebetween. In other words, since gaps are secured between the central region of the liquid crystal panel 100 and the first and second polarizing plates 140 and 150, respectively, it is possible to prevent the generation of Newton's ring.

[Seventh Embodiment]

Figure 10:
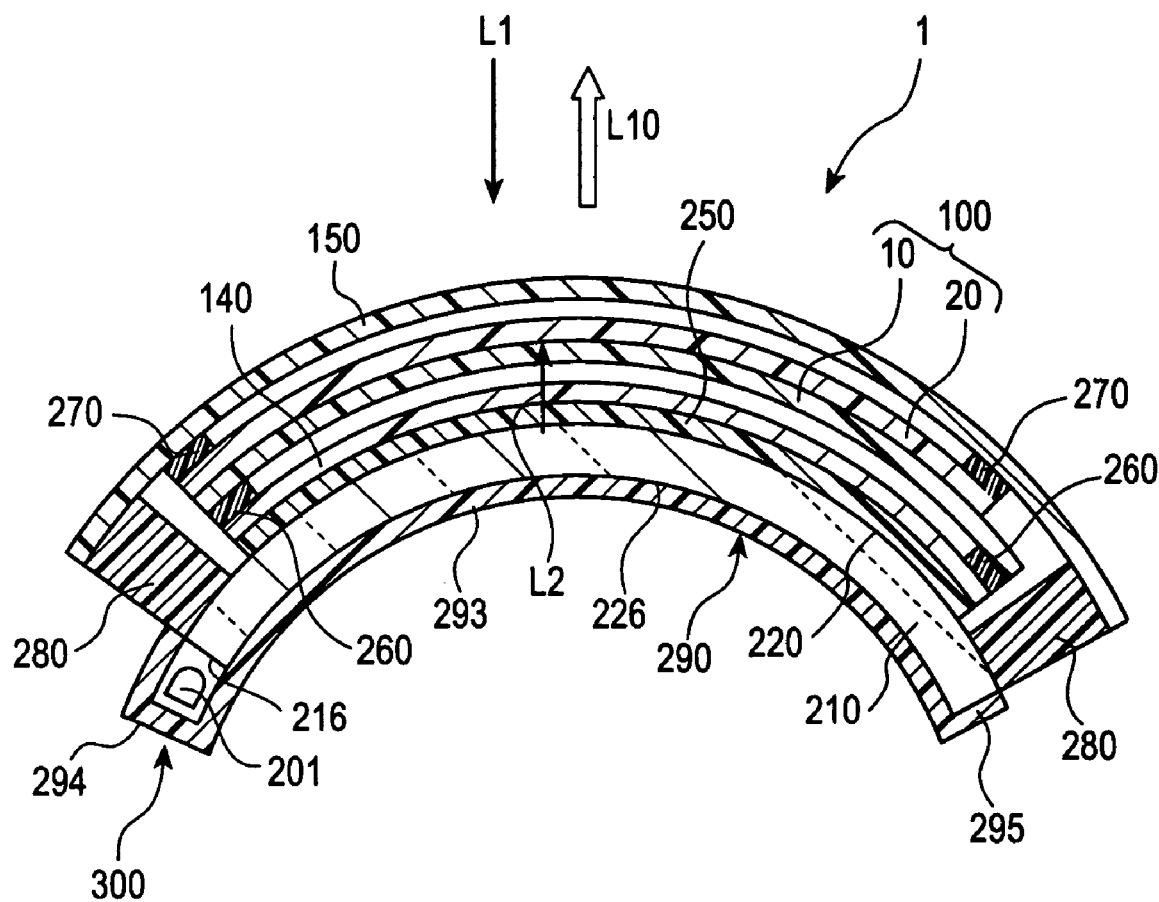
FIG. 10 is a cross-sectional view illustrating the structure of an electro-optical device according to a seventh embodiment of the present invention.

FIG. 10 is a cross-sectional view illustrating the structure of an electro-optical device according to the seventh embodiment of the present invention.

As shown in FIG. 10, similarly to the sixth embodiment, in the present embodiment, a backlight unit 300 is provided on the rear side of a liquid crystal panel 100, and the backlight unit 300 comprises a transmissive base 210 (a light guide plate) having a convexly curved surface 220 (a light exit surface), a light source 201 composed of a plurality of LEDs for emitting light toward a side end portion 216 of the base 210, and a reflector 290 for covering the rear side of the base 210.

A rear surface 226 opposite to the curved surface 220 of the base 210 is formed of a concavely curved surface in accordance with the shape of the convexly curved surface 220. In addition, the reflector 290 comprises a curved surface portion 293 curved along the rear surface 226 of the base 210, a bent portion 294 formed by bending an end of the curved surface portion 293 to enclose the light source 201, and a bent portion 295 formed by bending the other end of the curved surface portion 293 to cover the other end of the base opposite to the end where the light source 201 is arranged.

Further, if necessary, a sheet-shaped optical component 250, such as a prism sheet or a diffuser sheet, is arranged between the first polarizing plate 140 and the curved surface 220 of the base 210. In addition, although not shown in FIG. 10, a process, such as an embossing process, dot printing, dot forming, or minute prism forming, is performed on the curved surface 220 and rear surface 226 of the base 210 in order to obtain uniform brightness and to improve brightness.

Furthermore, in the electro-optical device 1 of the present embodiment, similarly to the sixth embodiment, the sheet-shaped optical component 250, the first polarizing plate 140 having a thickness of 300 μm to 400 μm, the first spacers 260, the liquid crystal panel 100 comprising the TFT array substrate 10 and the counter substrate 20, the second spacers 270, and the second polarizing plate 150 having an area larger than that of the TFT array substrate 10 and a thickness of 300 μm to 400 μm are superposed in this order on the curved surface 220 of the base 210. Herein, the second polarizing plate 150 is fixed to the base 210 by an adhesive 280, such as a double-faced tape, at the outside of the outer circumference of the liquid crystal panel 100, so that the first polarizing plate 140 and the liquid crystal panel 100 are maintained in a curved state. Therefore, the liquid crystal panel 100 is maintained in the curved state along the curved surface 220 of the base 210 of the backlight unit 300.

In the electro-optical device 1 having the above-mentioned structure, light emitted from the light source 201 travels in the base 210, and exits toward the liquid crystal panel 100 through the curved surface 220. Therefore, when the liquid crystal panel 100 is a transmissive type, light (which is indicated by arrow L2) emitted from the backlight unit 300 is optically modulated in the liquid crystal panel 100, and then exits therefrom as display light (which is indicated by arrow L10). On the other side, when the liquid crystal panel 100 is a transflective type, external light (which is indicated by arrow L1) and light (which is indicated by the arrow L2) emitted from the backlight unit are optically modulated in the liquid crystal panel 100, and then exit therefrom as display light (which is indicated by the arrow L10).

Herein, the curved surface 220 of the base 210 of the backlight unit 300 is used as a light exit surface, and the liquid crystal panel 100 is curved based on the curved shape of the curved surface 220. Therefore, it is possible to emit uniform light from the backlight unit 300 toward the entire surface of the liquid crystal panel 100 through the light guide plate. As a result, since a bright region and a dark region are not formed on the image display surface of the electro-optical device 1, it is possible to obtain the same effects as those in the sixth embodiment.

[Eighth Embodiment]

In the sixth and seventh embodiments, the base 210 (the light guide plate) having the convexly curved surface 220 (the light exit surface) is used. However as shown in FIG. 11, a base 210 (a light guide plate) having a concavely curved surface 230 (a light exit surface) may be used.

Figure 11:
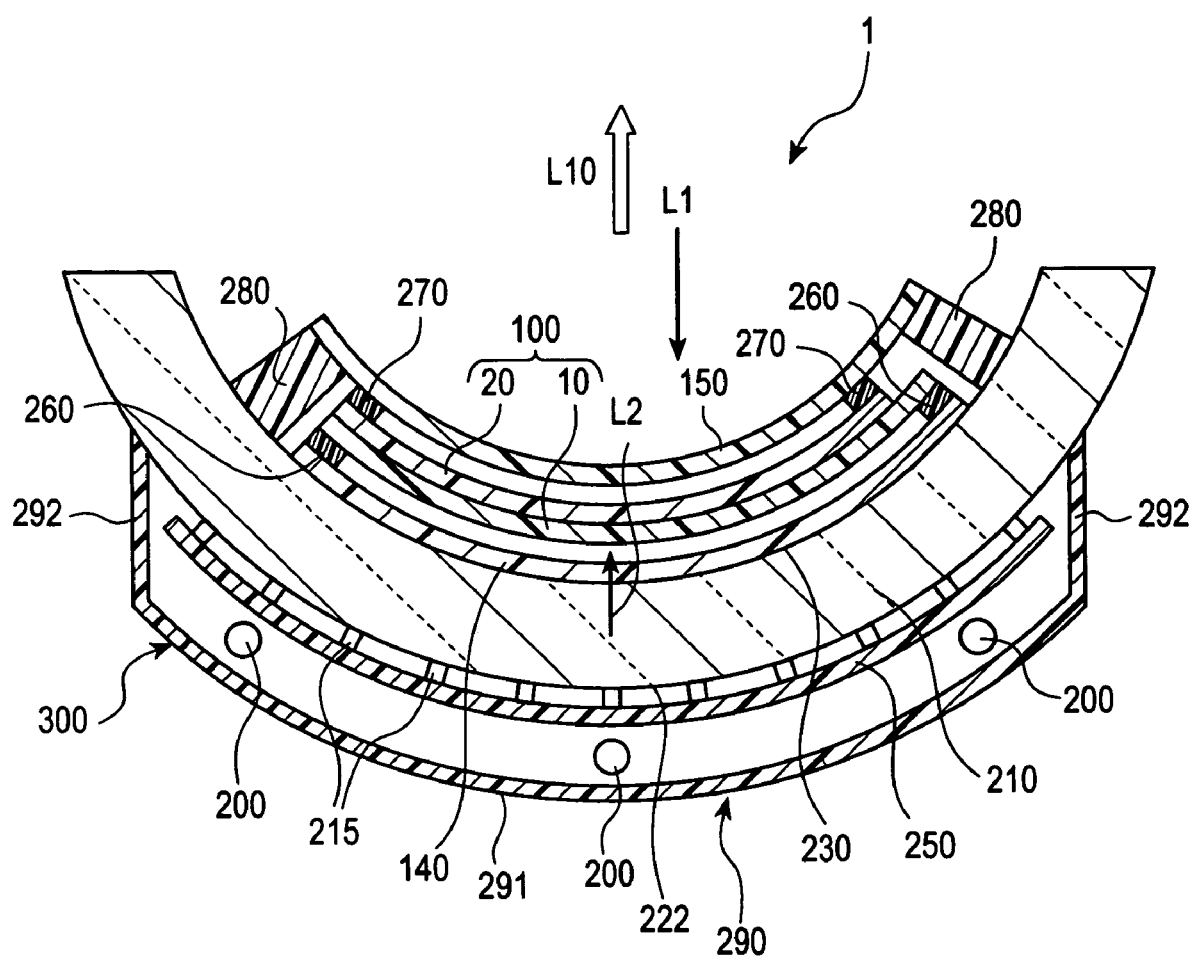
FIG. 11 is a cross-sectional view illustrating the structure of an electro-optical device according to an eighth embodiment of the present invention.

FIG. 11 is a cross-sectional view illustrating the structure of an electro-optical device according to the eighth embodiment of the present invention.

As shown in FIG. 11, similarly to the sixth embodiment, in the present embodiment, a backlight unit 300 is provided on the rear side of a liquid crystal panel 100, and the backlight unit 300 comprises a transmissive base 210 (a light guide plate) having a concavely curved surface 230 (a light exit surface), a plurality of light sources 200, each composed of a cold cathode fluorescent lamp, that is arranged on the rear side of the base 210 for emitting light toward a light incident surface 222, which is the other side of the base 210, and a reflector 290 for covering the rear sides of these light sources 200.

Herein, the light incident surface 222 of the base 210 is formed of a convexly curved surface in accordance with the shape of the concavely curved surface 230. The reflector 290 comprises a portion 291 that is opposite to the light incident surface 222 of the base 210 and has a curved surface in accordance with the convexly curved surface of the light incident surface 222 of the base 210, and bent portions 292 formed by bending both ends of the curved surface portion 291. The space in which the light sources 200 are arranged is covered with the reflector 290 on three sides.

A process 215, such as an embossing process, dot printing, dot forming, or minute prism forming, is performed on the light incident surface 222 of the base 210 in order to obtain uniform brightness and to improve brightness. In addition, a sheet-shaped optical component 250, such as a prism sheet or a diffuser sheet, is arranged between the light sources 200 and the light incident surface 222 of the base 210.

Further, in the electro-optical device 1 of the present embodiment, similarly to the sixth embodiment, the first polarizing plate 140 having a thickness of 300 μm to 400 μm, the first spacers 260, the liquid crystal panel 100 comprising the TFT array substrate 10 and the counter substrate 20, the second spacers 270, and the second polarizing plate 150 having an area larger than that of the TFT array substrate 10 and a thickness of 300 μm to 400 μm are superposed in this order on the curved surface 230 of the base 210. Herein, the second polarizing plate 150 is fixed to the base 210 by an adhesive 280, such as a double-faced tape, at the outside of the outer circumference of the liquid crystal panel 100, so that the first polarizing plate 140 and the liquid crystal panel 100 are maintained in a curved state. Thus, the liquid crystal panel 100 is maintained in a curved state along the curved surface 230 of the base 210 of the backlight unit 300.

In the electro-optical device 1 having the above-mentioned structure, light emitted from the light source 200 is directly incident on the base 210 through the light incident surface 222 of the base 210, or is reflected by the reflector 290 and is then incident on the base 210 through the light incident surface 222 of the base 210. Then, the light travels from the curved surface 230 to the liquid crystal panel 100. Therefore, when the liquid crystal panel 100 is a transmissive type, light (which is indicated by arrow L2) emitted from the backlight unit 300 is optically modulated in the liquid crystal panel 100, and then exits therefrom as display light (which is indicated by arrow L10). On the other side, when the liquid crystal panel 100 is a transflective type, external light (which is indicated by arrow L1) and light (which is indicated by the arrow L2) emitted from the backlight unit are optically modulated in the liquid crystal panel 100, and then exit therefrom as display light (which is indicated by the arrow L10).

Herein, the liquid crystal panel 100 is curved based on the curved shape of the curved surface 230 of the base 210 of the backlight unit 300. Therefore, it is possible to emit uniform light from the backlight unit 300 toward the entire surface of the liquid crystal panel 100 through the base 210. As a result, since a bright region and a dark region are not formed on the image display surface of the electro-optical device 1, it is possible to obtain the same effects as those in the sixth embodiment.

[Ninth Embodiment]

Figure 12:
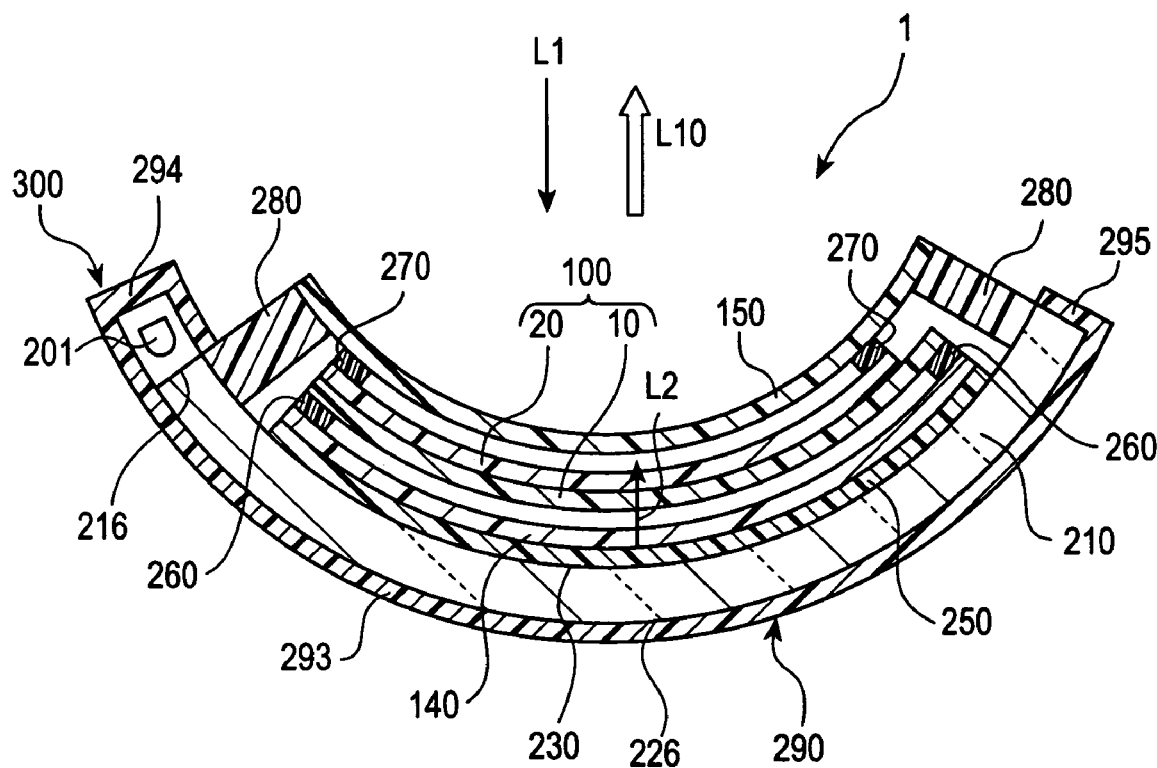
FIG. 12 is a cross-sectional view illustrating the structure of an electro-optical device according to a ninth embodiment of the present invention.

FIG. 12 is a cross-sectional view illustrating the structure of an electro-optical device according to the ninth embodiment of the present invention.

As shown in FIG. 12, similarly to the sixth embodiment, in the present embodiment, a backlight unit 300 is provided on the rear side of a liquid crystal panel 100. In the present embodiment, the backlight unit 300 comprises a transmissive base 210 (a light guide plate) having a concavely curved surface 230 (a light exit surface), a light source 201 composed of a plurality of LEDs for emitting light toward a side end portion 216 of the base 210, and a reflector 290 for covering the rear side of the base 210.

Herein, a rear surface 226 opposite to the curved surface 230 of the base 210 is formed of a convexly curved surface in accordance with the shape of the concavely curved surface 230. In addition, the reflector 290 comprises a curved surface portion 293 curved along the rear surface 226 of the base 210, a bent portion 294 formed by bending an end of the curved surface portion 293 to enclose the light source 201, and a bent portion 295 formed by bending the other end of the curved surface portion 293 to cover the other end of the base opposite to the end where the light source 201 is arranged.

Since the other structures are the same as those in the sixth, seventh, and eighth embodiments, a description thereof will be omitted. Also, in the present embodiment, the liquid crystal panel 100 is curved based on the curved shape of the curved surface 230 of the base 210 of the backlight unit 300. Therefore, it is possible to emit uniform light from the backlight unit 300 toward the entire surface of the liquid crystal panel 100 through the base 210. As a result, since a bright region and a dark region are not formed on the image display surface of the electro-optical device 1, it is possible to obtain the same effects as those in the sixth embodiment.

[Other Embodiments]

Figure 13:
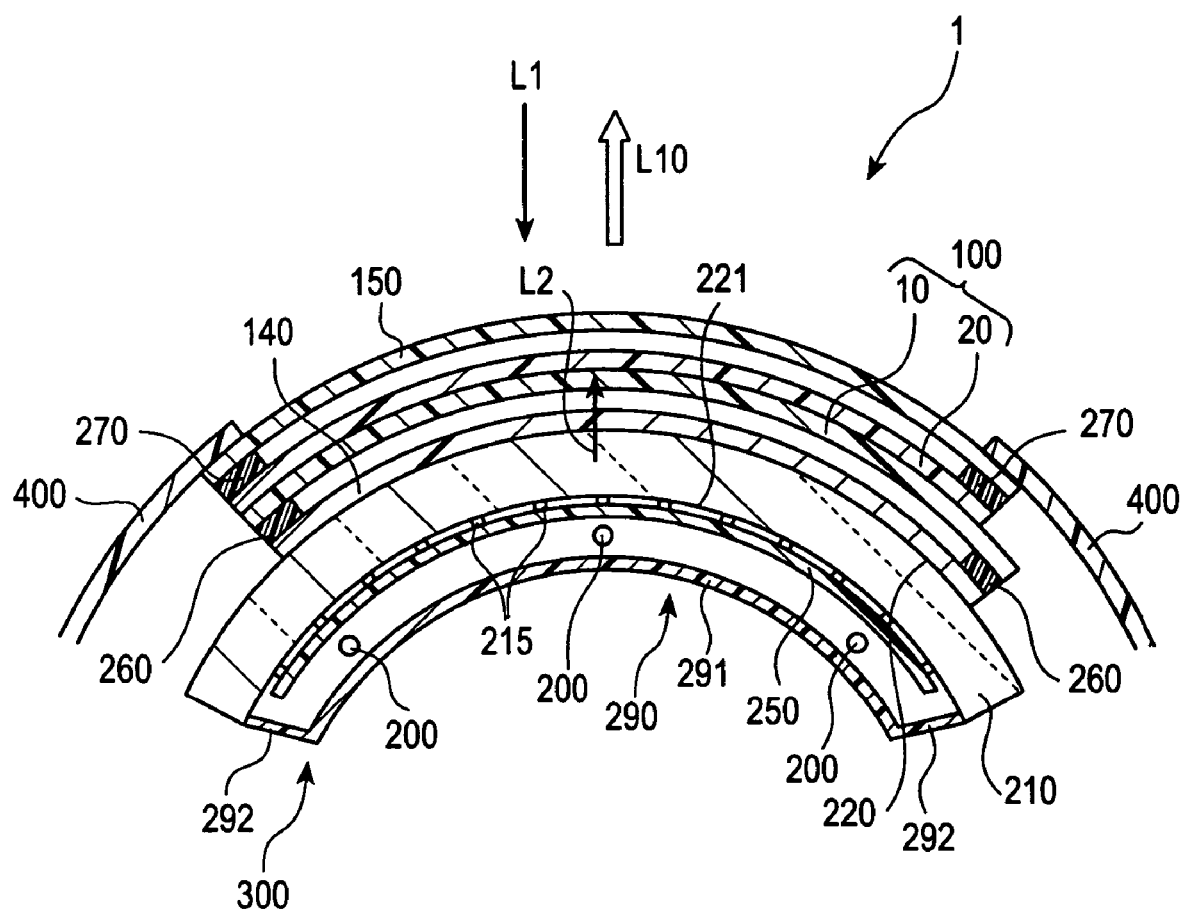
FIG. 13 is a cross-sectional view illustrating the structure of an electro-optical device according to the other embodiment of the present invention.

In the above-mentioned embodiments, a double-face tape is used as an adhesive 280 in order to fix the second polarizing plate 150 to the base 210 at the outside of the outer circumference of the liquid crystal panel 100. However, the upper surface of the second polarizing plate 150 may be fixed to the base 210 by a single faced tape, or the upper surface of the second polarizing plate 150 may be mechanically fixed to the base by a clip or a frame. In addition, as shown in FIG. 13, the first polarizing plate 140, the liquid crystal panel 100, and the second polarizing plate 150 may be maintained in a curved state by pressing and fixing the second polarizing plate 150 to the base 210 using a frame 400 for covering the second polarizing plate 150 from the upper side.

Further, in the above-mentioned embodiments, the liquid crystal panel is curved in the direction of arrow B1 out of the directions of arrows A1, A2, B1, and B2 shown in FIGS. 1(A) and 1(B). However, the liquid crystal panel may be curved in any direction.

Furthermore, the liquid crystal panel to which the present invention is applied is not limited to an active matrix liquid crystal panel having TFT elements as pixel switching elements, but a passive matrix liquid crystal panel or an active matrix liquid crystal panel having TFD elements as the pixel switching elements can be used.

Figure 14:
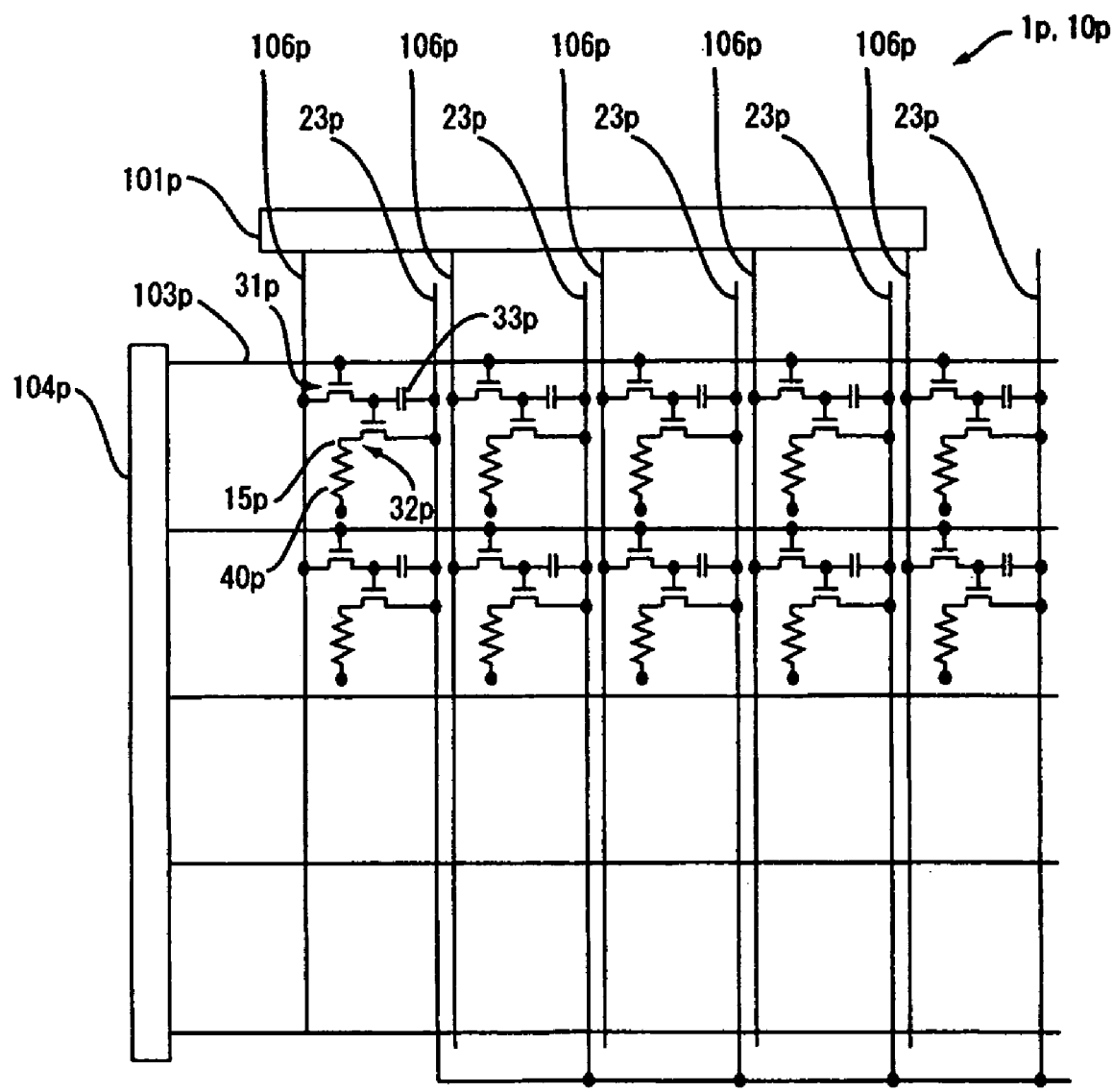
FIG. 14 is a block diagram of an active matrix electro-optical device using charge-injection-type organic thin film electro-luminescent elements.

Moreover, the structures according to the first to fifth embodiments are not limited to liquid crystal devices, but can be applied to organic electro-luminescent display devices shown in FIG. 14.

FIG. 14 shows a block diagram of an active matrix electro-optical device using charge-injection-type organic thin film electro-luminescent elements.

An electro-optical device 1p shown in FIG. 14 is an active matrix display device in which the drive of light-emitting elements, such as electro-luminescent (EL) elements or light-emitting diodes (LEDs) that emit light by drive currents passing through their organic semiconductor films, is controlled by TFTs. Since light-emitting elements used for this type of electro-optical devices are a self-light-emitting type, a backlight is not needed, and the viewing angle independence is small.

In the electro-optical device 1p shown in FIG. 14, a plurality of scanning lines 103p, a plurality of data lines 106p extending orthogonal to the direction in which the scanning lines 103p extend, a plurality of common feeder lines 23p parallel to the data lines 106p, and pixel regions 15p corresponding to the intersections of the data lines 106p and the scanning lines 103p are formed on a TFT array substrate 10p. The data lines 106p are connected to a data line driving circuit 101p having a shift register, a level shifter, a video line, and an analog switch. The scanning lines 103p are connected to a scanning line driving circuit 104p having a shift register and a level shifter.

Further, each of the pixel regions 15p is provided with a first TFT 31p having a gate electrode to which a scanning signal is supplied through the corresponding scanning line 103p, a storage capacitor 33p holding an image signal supplied from the corresponding data line 106p via the first TFT 31p, a second TFT 32p (a thin film semiconductor element) having a gate electrode to which the image signal held in the storage capacitor 33p is supplied, a light-emitting element 40p which is electrically connected to the corresponding common feeder line 23p through the second TFT 32p and to which a driving current flows from the common feeder line 23p. Therefore, since the storage capacitor 33p holds the image signal supplied from the data line 106p via the first TFT 31p, a gate electrode 31p of the second TFT 32p is maintained at the potential corresponding to the image signal even when the first TFT 31p is in an off state. As a result, the driving current continuously flows into the light-emitting element 40p from the common feeder line 23p, so that the light-emitting element 40p continuously emits light, thereby displaying an image.

Also, in such an electro-optical device 1p, since the light-emitting elements 40p, the TFTs 31p, the data lines 106p and the like are formed on the TFT array substrate 10p by semiconductor processes, a hard substrate, such as a glass substrate, is used as the TFT array substrate 10p. In this case, the present invention may also be applied when thinning down a substrate using a polishing process to curve it.

[Application to Electronic Apparatus]

Although not shown in the drawings, an electro-optical device according to the present invention can be used for display units of portable electronic apparatuses, such as mobile phones and mobile computers, and for electronic apparatuses, such as large-sized display devices that are provided on the streets or in front of stores for image display.

What is claimed is:

1. An electro-optical device comprising:
  a sheet-shaped electro-optical device substrate made of a hard material;
  an electro-optical material held in the electro-optical device substrate, the electro-optical material being an electro-luminescent material; and
  a first member having a curved surface,
  wherein the electro-optical device substrate is fixed to the first member so as to curve along the curved surface.

2. The electro-optical device according to claim 1,
  wherein the electro-optical device substrate is a glass substrate or a quartz substrate.

3. The electro-optical device according to claim 1,
  wherein the electro-optical device substrate has a thickness of 250 µm or less.

4. The electro-optical device according to claim 1,
  wherein the curved surface is a convexly curved surface.

5. The electro-optical device according to claim 1,
  wherein the curved surface is a concavely curved surface.

6. An electro-optical device comprising:
  a sheet-shaped electro-optical device substrate made of a hard material;
  an electro-optical material held in the electro-optical device substrate; and
  a first member having a curved surface,
  wherein the electro-optical device substrate is fixed to the first member so as to curve along the curved surface,
  the electro-optical device substrate and a second member are superposed on the curved surface of the first member in this order, and
  the second member is fixed to the first member at the outside of an outer circumference of the electro-optical device substrate in a state in which the outer circumference of the electro-optical device substrate is pressed against the first member, so that the electro-optical device substrate is maintained in a curved state.

7. The electro-optical device according to claim 6,
  wherein one or more sheet-shaped optical components are arranged on a surface of the electro-optical device substrate opposite to the first member, and
  one of the sheet-shaped optical components is fixed, serving as the second member, to the first member at the outside of the outer circumference of the electro-optical device substrate.

8. The electro-optical device according to claim 7,
  wherein spacers are arranged between the first member and the outer circumference of the electro-optical device substrate and/or between the outer circumference of the electro-optical device substrate and the second member, and
  the electro-optical device substrate is maintained in a curved state between the first member and the second member such that a central region of the surface on which the spacers are arranged is not brought into planar contact with other members.

9. The electro-optical device according to claim 8,
wherein a base, which is the first member, a first polarizing plate, the electro-optical device substrate, and a second polarizing plate having an area larger than that of the electro-optical device substrate are superposed in this order, and a sheet having unevenness thereon is arranged between the first polarizing plate and the electro-optical device substrate and/or between the electro-optical device substrate and the second polarizing plate, and the second polarizing plate, which is the second member, is fixed to the base at the outside of the outer circumference of the electro-optical device substrate, so that the first polarizing plate, the electro-optical device substrate, and the sheet having unevenness are maintained in the curved state along the curved surface.

10. The electro-optical device according to claim 9,
wherein the sheets each having unevenness are arranged between the first polarizing plate and the electro-optical device substrate and between the electro-optical device substrate and the second polarizing plate, respectively.

11. The electro-optical device according to claim 7,
wherein first spacers are arranged between the first member and the outer circumference of the electro-optical device substrate, and second spacers are arranged between the outer circumference of the electro-optical device substrate and the second member, and the electro-optical device substrate is maintained in a curved state between the first member and the second member such that central regions of both surfaces thereof are not brought into planar contact with other members.

12. The electro-optical device according to claim 11,
wherein a base, which is the first member, a first polarizing plate, the first spacers, the electro-optical device substrate, the second spacers, and a second polarizing plate having an area larger than that of the electro-optical device substrate are superposed in this order, the first polarizing plate is arranged so as to be curved along the curved surface of the base, the electro-optical device substrate is arranged in the curved state on the first polarizing plate with the first spacers interposed therebetween, and the second polarizing plate, which is the second member, is arranged in the curved state on the electro-optical device substrate with the second spacers interposed therebetween and is fixed to the base at the outside of the outer circumference of the electro-optical device substrate.

13. An electro-optical device comprising:
a sheet-shaped electro-optical device substrate made of a hard material;
an electro-optical material held in the electro-optical device substrate;
a first member having a curved surface; and
a light source for emitting light toward the first member,
wherein the electro-optical device substrate is fixed to the first member so as to curve along the curved surface and wherein the first member is made of a transmissive material and is used as a light guide plate for transmitting light emitted from the light source toward the electro-optical device substrate through the curved surface, which is a light exit surface.

14. The electro-optical device according to claim 13,
wherein the outer circumference of the electro-optical device substrate is pressed against the light guide plate by a member arranged on a surface of the electro-optical device substrate opposite to the first member, so that the electro-optical device substrate is maintained in a curved state.

15. The electro-optical device according to claim 13,
wherein the light source emits light toward a light incident surface, which is the other surface of the first member opposite to the curved surface.

16. The electro-optical device according to claim 15,
wherein the light incident surface of the first member is composed of a concavely curved surface, and
the light source is arranged in a concave space defined by the light incident surface.

17. The electro-optical device according to claim 13,
wherein the light source is arranged such that light is incident on the light guide plate through a side end portion of the first member.

18. A method of manufacturing an electro-optical device in which an electro-optical material is held in a sheet-shaped electro-optical device substrate made of a hard material, the method comprising the steps of:
curving the electro-optical device substrate between a first member and a second member, and
fixing the second member to the first member at the outside of an outer circumference of the electro-optical device substrate to maintain the electro-optical device substrate in a curved state.

19. The method of manufacturing an electro-optical device according to claim 18,
wherein one or more sheet-shaped optical components are arranged on a surface of the electro-optical device substrate opposite to the first member, and
one of the sheet-shaped optical components is fixed, serving as the second member, to the first member at the outside of the outer circumference of the electro-optical device substrate.

* * * * *